(12) United States Patent
Hihara et al.

(10) Patent No.: US 6,388,057 B1
(45) Date of Patent: May 14, 2002

(54) CRYSTALLINE MODIFICATION OF A WATER-INSOLUBLE MONOAZO DYE

(75) Inventors: Toshio Hihara, Kitakyusyu; Hiroshi Inoue, Toyonaka; Yousuke Takahashi, Omuta, all of (JP)

(73) Assignee: DyStar Textilfarben GmbH & Co. Deutschland KG (DE)

( * ) Notice: Subject to any disclaimer, the term of this patent is extended or adjusted under 35 U.S.C. 154(b) by 0 days.

(21) Appl. No.: 09/869,672

(22) PCT Filed: Jan. 5, 2000

(86) PCT No.: PCT/EP00/00046

§ 371 Date: Aug. 31, 2001

§ 102(e) Date: Aug. 31, 2001

(87) PCT Pub. No.: WO00/40795

PCT Pub. Date: Jul. 13, 2000

(30) Foreign Application Priority Data

Jan. 8, 1999 (JP) ............................. 11-002978

(51) Int. Cl.[7] ..................... C09B 67/48; C09B 67/10; D06P 3/54

(52) U.S. Cl. ............... 534/575; 8/526; 8/696; 8/922; 534/588

(58) Field of Search .................. 534/575; 8/526, 8/696, 922

(56) References Cited

U.S. PATENT DOCUMENTS 4,985,043 A  1/1991  Bühler et al. ............... 8/639
4,985,044 A  1/1991  Hähnke et al. ............... 8/639
5,744,588 A  4/1998  Himeno et al. ............. 534/581

FOREIGN PATENT DOCUMENTS

EP  0031478  7/1981
EP  0336163  10/1989
EP  0346715  12/1989
EP  0373525  6/1990

*Primary Examiner*—Fiona T. Powers
(74) *Attorney, Agent, or Firm*—Connolly Bove Lodge & Hutz LLP

(57) ABSTRACT

A water-insoluble monoazo dye represented by the following structural formula [I]

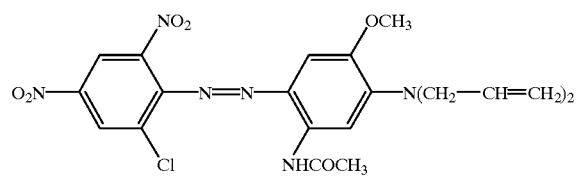

having a crystal modification characterized by an X-ray diffraction pattern ($CuK_\alpha$) showing one strong peak at a diffraction angle (2θ) of 11.1±0.1° and also four intermediate peaks at 8.1±0.1°, 21.8±0.1°, 23.1±0.1° and 25.2±0.1°.

4 Claims, 1 Drawing Sheet

CRYSTALLINE MODIFICATION OF A WATER-INSOLUBLE MONOAZO DYE

The present invention relates to a monoazo dye and, in particular, it relates to a blue monoazo dye with a novel crystal modification which is outstanding in its dispersion properties.

Furthermore the present invention also relates to a method in which this monoazo dye is used for the dyeing of fibre, especially polyester fibre and, in particular, it relates to a method for the dyeing of fibre, especially polyester fibre, under conditions which are more severe than hitherto.

In recent years, in the world of dyeing the methods of dyeing have been variously rationalized. For example, in the case of the dyeing of polyester fibre using disperse dyes, for fabric there are liquid flow dyeing methods and for yarn there are cheese dyeing methods or package dyeing methods, and the like, and these methods are widely carried out.

Since these dyeing methods comprise systems in which dyeing is performed by forcibly circulating a dye dispersion liquor through stationary close-packed layers in which a number of layers of fibre have been wound, it is particularly important that the dispersion properties of the dye in the dye bath be more outstanding than in the past. If, due to poor dispersion, dye particles aggregate together and produce comparatively large aggregates, a dye particle filtration phenomenon by the fibre layers occurs, and because of poor penetration of the dye into the fibre interior and adhesion of the aggregates at the surface of the item being dyed, etc, problems arise such as uneven depths of dyeing at the inner and outer layers, and a lowering of fastness such as rubbing fastness and the like.

In particular, very recently, from the point of view of economizing on resources and energy, there has been a move towards more severe dyeing conditions, namely (1) lowering the bath ratio of the dye bath (for example lowering the ratio of the material being dyed to the dye liquor from 1:30 to 1:10), (2) lowering tile proportion of the dispersing agent used (for example lowering the ratio of the dye cake to the dispersing agent from 1:3 to 1:1), (3) raising the temperature and shortening the time of dyeing (for example changing the dyeing conditions from 1 hour at 130° C. to 0.5 hour at 135° C.), and (4) increasing the rate and lowering the time of heating (for example from 1° C./min to 2° C./min), but such conditions all work to the disadvantage of the dye dispersion stability, so from this standpoint dyes with better dispersion properties are needed all the more.

Because of this situation, quite a number of the dyes which have been comparatively satisfactory in their dispersion properties hitherto have become inadequate in terms of their dispersion properties in the more demanding recent dyeing methods and dyeing conditions.

For Example, the acetanilide type monoazo dye represented by structural formula (I)

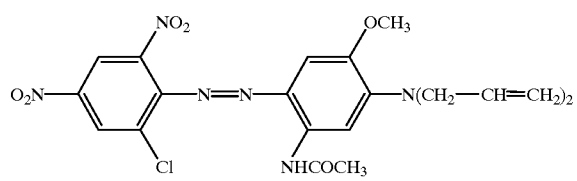

(I)

which is obtained by performing a coupling reaction between a diazo component and a coupling component, uniformly dyes polyester fibre under the conventional mild dyeing conditions and is outstanding too in terms of the different measures of fastness, but under more severe conditions as described above its dispersion is inadequate and it is extremely difficult to obtain dyed materials of a uniform depth of dyeing.

Moreover this dye also has a problem in terms of its compatibility with various dyeing auxiliaries. For example, its high temperature dispersion stability in the presence of Glauber's salt ($Na_2SO_4$) is extremely poor and, consequently, when the dyeing of polyester/cotton mixed-spun products is carried out jointly using a reactive dye or the like in the presence of Glauber's salt, there is non-level dyeing. Furthermore, when used as a mixture with other dyes, there has been the problem that, because of poor compatibility with the mixed dye, colour variation and uneven dyeing arise.

Consequently, there is an increasingly greater need for dyes which are outstanding in their dispersion properties and which, even when employing more severe dyeing methods and conditions, produce level dyeing with outstanding fastness.

Thus, the problem addressed by the present invention is to resolve the aforesaid conventional difficulties and to provide a dye which is excellent in its dispersion properties.

As a result of a painstaking investigation of the above difficulties, the present inventors have discovered: that there are present in the acetanilide type monoazo compound represented by structural formula (I) at least two types of crystal modification, one of these being the crystal modification obtained by the normal conventional method and the other being a novel crystal modification; and that the stability of the dispersed state in the dyestuff dye bath is strongly related not just to the size of the dye particles but also to the crystal modification present; and that when the compound displays the aforesaid novel crystal modification it is markedly more outstanding in its dispersion properties than the conventional crystal modification; and also that by using this compound as a dye it is possible to obtain a dye which gives more satisfactory dyeing under both conventional dyeing conditions and more severe conditions. It is based on these discoveries that they have arrived at the present invention.

Thus, the present invention provides a water-insoluble monoazo dye represented by the structural formula (I), of a crystal modification characterized by an X-ray diffraction pattern ($CuK_\alpha$) showing one strong peak at a diffraction angle ($2\theta$) of 11.1±0.1° and also four intermediate peaks at 8.1±0.1°, 21.8±0.1°, 23.1±0.1° and 25.2±0.1°.

The novel crystal modification of the present invention (hereinafter referred to as the ($\alpha$-form crystal modification) can be obtained in the following manner.

For example, the monoazo compound of aforesaid structural formula [I] is synthesized by diazotizing 6-chloro-2,4-dinitroaniline in the usual way, and then carrying out a coupling reaction with the coupler 3-(N,N-diallyl)amino-4-methoxyacetanilide in an aqueous medium at a temperature of 5 to 15° C., and preferably 0 to 10° C., for from 0.5 to 15 hours.

Taking the crystal modification in the cake of the monoazo compound obtained by such synthesis as the $\beta$-form crystal modification, in the present invention this cake is converted to the $\alpha$-form crystal modification by further treatment under specified conditions. The treatment method employed comprises for example, (1) the method of dispersing the cake of the $\beta$-form crystal modification in an aqueous medium, in certain circumstances in the presence of a dispersing agent such as a formaldehyde condensate of naphthalene sulphonic acid, or a concentrate of sulphide pulp waste liquor in which the chief component is sodium lignin sulphonate, and then carrying out a stirring treatment at a temperature of 60 to 130° C., preferably 80 to 100° C., for 0.5 to 30 hours, preferably from 1 to 10 hours, and (2)

the method of dispersing the cake of the β-form crystal modification in an organic solvent such as an alcohol like methanol, ethanol or butanol, an ether such as dioxane, or ethylene glycol or glycol ether, and carrying out a stirring treatment at a temperature of 15 to 100° C., preferably 20 to 80° C., for 0.5 to 10 hours.

Next, the α-form crystal modification and the β-form crystal modification of the monoazo compound represented by aforesaid structural formula [I] are explained by means of the drawings.

Figures 1, 2:
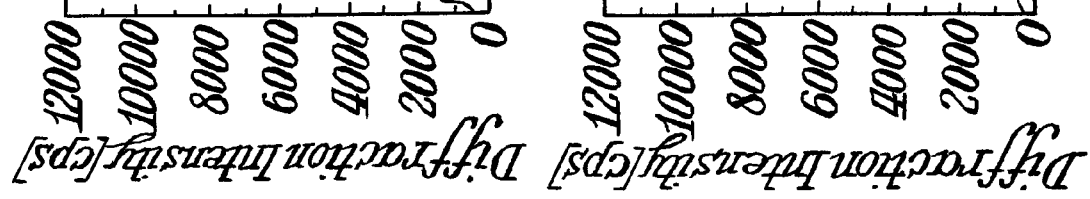
FIG. 1 and FIG. 2 are X-ray diffraction patterns obtained using a model RAD-RB produced by Rigaku Denki, under the following conditions.

(X-radiation) CuK-alpha 1/40 kV/100 mA (counter monochromator) curved crystal monochromator (divergent slit) 1 deg (scatter slit) 1 deg (light-receiving slit) 0.1 5 mm (scanning mode) continuous (scan speed) 5.0°/min (scan step) 0.1°/min (scan axis) 2θ/θ by the powder X-ray diffraction method, with the diffraction of the $CuK_\alpha$ radiation being recorded using a proportional counter. The horizontal axis is the diffraction angle (2θ) and the vertical axis is the diffraction intensity. FIG. 1 is the diffraction pattern of the α-form crystal modification, which is the novel crystal form of the present invention, and, in particular, it possesses one strong peak at a diffraction angle (2θ) of about 11.1° and also four intermediate peaks at about 8.1°, about 21.8°, about 23.1° and about 25.2°. FIG. 2 is the diffraction pattern showing the conventional β-form crystal modification, and it is clear that this diffraction pattern is different from that in FIG. 1.

For identical crystal forms, the diffraction angles based on the X-ray diffraction method always agree to within an error of about ±0.1°, so these diffraction patterns clearly show mutually different crystal modifications.

On account of this difference of crystal modification, the monoazo compound in its novel α-form crystal modification of the present invention has a different behaviour at the time of dyeing from the conventional β-form and, as is shown from Experimental Examples 1 and 2 below, the dispersion properties are extremely outstanding.

Furthermore, the present invention also offers a method of using the monoazo dye with this novel α-form crystal modification in the dyeing of fibre, in particular polyester fibre.

The dyeing is carried out by dispersing the monoazo dye of the present invention in an aqueous medium, in the presence or absence of dispersing agent, to prepare a dye bath or printing paste, after which dip dyeing or printing is carried out, optionally under more severe conditions.

For example, in the case of dip dyeing, there can be applied high temperature dyeing methods, carrier dyeing methods, Thermosol dyeing methods or other such dyeing treatments and, in such circumstances, dyeing methods such as the aforesaid liquid flow dyeing method, cheese dyeing method or package dyeing method can be favourably employed.

With regard to the dyeing conditions, it is possible to use the normal conditions employed in the disperse dyeing field, in particular there can be advantageously used conditions which are more severe than those conventionally employed.

As examples of normal conditions, there can be used conditions comprising a dye bath ratio of from 20 to 40 times the weight in terms of the material being dyed, preferably about 30 times the weight, with the proportion of the dispersing agent used in terms of the dye being at least 3 times the weight and preferably about 3 times the weight.

As examples of the more severe conditions, there can be used conditions comprising a dye bath ratio which is less than 15 times the weight in terms of the material being dyed, preferably from 8 to 13 times the weight, and in particular about 10 times the weight, with the proportion of dispersing agent used in terms of the dye being no more than 3 times the weight, preferably from 0.5 to 2 times the weight, and in particular about the same proportions (1:1). The monoazo dye according to the present invention shows good dispersion properties even under such conditions and can give level dyeing.

The dyeing temperature can be selected from within a broad range. For example, in addition to the aforesaid conditions, the dyeing temperature can be selected from within the range 100 to 150° C., and in particular 120 to 140° C.

The dyeing time is not particularly restricted and should be sufficient to realise satisfactory dyeing, but there is normally used a dyeing time of from 20 minutes to 90 minutes, in particular from 30 minutes to 60 minutes, depending on the dyeing temperature used.

What is particularly advantageous is that the dispersion stability of the monoazo dye of the present invention can be maintained even at dyeing temperatures higher than those of 130° C. or more used in conventional dyeing methods and, under such conditions, satisfactory dyeing is realized within a comparatively short dyeing time of less than 1 hour, preferably 20 to 40 minutes and in particular about 30 minutes.

Furthermore, in the case of the monoazo dye of the present invention, it has been discovered that even when the temperature of the dye bath is raised to the dyeing temperature at a more rapid heating rate than hitherto, the dispersion of the dye in the dye bath remains stable and no problems such as uneven dyeing or a lowering of fastness due to poor stability are observed. Thus, in the case where the monoazo dye or the present invention is used, it is possible to employ a heating rate of more than 1° C./min, preferably 2 to 3° C./min and in particular 2 to 2.5° C./min. In the same way as hitherto, first of all the dye bath temperature is increased to about 60–80° C., normally about 70° C., at any rate, after which the temperature is increased to the dyeing temperature at the above rate of heating.

The aforesaid more severe conditions can be individually employed or there may be used a combination thereof.

The dispersing agent used may be any dispersing agent normally employed in the field of dyeing by means of disperse dyes and it is not particularly restricted but examples are the condensates of naphthalene sulphonic acid and formaldehyde, higher alcohol sulphate esters, higher alkylbenzenesulphonates and the like.

The types of fibre which can be dyed using the monoazo dye of the present invention are those commonly employed in the disperse dyes field, namely acetate, nylon, polyester and other such hydrophobic fibres, mixed-spun and mixed-weave products thereof, or mixed-spun or mixed-weave products of these hydrophobic fibres and natural fibres such as cotton or wool, in particular polyester fibre comprising polyethylene terephthalate or a polycondensate of terephthalic acid and 1,4-bis-(hydroxymethyl)cyclohexane, or mixed-spun or mixed-weave products of natural fibres such as cotton or wool and these polyester fibres.

Again, depending on the circumstances, it is also possible to add an acidic material such as formic acid, acetic acid, phosphoric acid or ammonium sulphate to the dye bath, and thus obtain even better effects such as even more level dyeing.

Furthermore, the novel crystal modification of the monoazo dye represented by aforesaid structural formula [I] according to the present invention, also has outstanding compatibility with various types of dyeing auxiliary, for example Glauber's salt, and other types of dye such as reactive dyes like C.I. Reactive Blue 19, C.I. Reactive Blue 225 and the like, and by the joint use of such dyeing auxiliaries and dyes there may sometimes be obtained beneficial effects such as enhanced level dyeing and reproducibility. In particular, this excellent compatibility with reactive dyes is advantageous when dyeing mixed-spun and mixed-weave products of an aforesaid hydrophobic fibre and a natural fibre such as cotton or wool.

As a preferred embodiment of the method of the present invention, polyester fibre undergoes dyeing to exhaustion using the monoazo dye of the present invention, in an aqueous medium in the presence of dispersing agent, under conditions comprising a dyeing temperature of 125–140° C., a dye bath ratio of no more than 15 times the weight, and a ratio of dispersing agent in terms of the dye of no more than 3 times the weight.

The specified crystal modification of the water-insoluble monoazo dyestuff according to the present invention shows extremely outstanding properties in terms of dispersion when compared to the conventional crystal modification and, because of these properties, dispersion stability is maintained in the dye bath even under more severe dyeing conditions comprising, for example, a dyed material:dye liquor ratio of 1:10 and a dye cake: dispersing agent ratio of 1:1, under dyeing conditions of 135° C. for 0.5 hour, with the dye bath being heated at a rate of 2° C./minute, and the dyed material obtained under such dyeing conditions is outstanding in its light fastness and rubbing fastness. Consequently, on account of such good dispersion properties, with the dyestuff of the present invention dyeing can be carried out more uniformly and with outstanding fastness. In particular, the dyestuff is extremely useful from the point of view of conserving energy and resources where dyeing is carried out under more severe conditions as described above. Moreover, when compared to the water-insoluble monoazo dye represented by the following structural formula [II], there is little metal ion sensitivity and build-up is good, so it is highly valuable as a disperse dye.

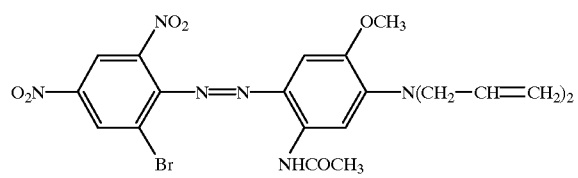

(II)

Next, the present invention is explained in still further detail by means of examples.

EXAMPLE 1

(Example of the Production of the Dye Crystals)

13.0 g of 3-(N,N-diallyl)amino-4-methoxyacetanilide was dispersed in 217 ml of water at 0–2° C. and employed as the coupling component. Next, 15.2 g of 43% nitrosylsulphuric acid was added to 14.6 g of 98% sulphuric acid and, while stirring, 10.9 g of 6-chloro-2,4-dinitro-aniline added slowly, to effect diazotization and to produce a diazonium compound solution. This solution was added dropwise at 0±2° C. to the aforesaid coupling component solution and stirred for 1 hour at the same temperature. The precipitated crystals were filtered off, washed with water and dried, and there was obtained 22.7 g of dark green crystals represented by aforesaid structural formula [I]. When the monoazo dye obtained by this reaction was analysed in the form of powder by the X-ray diffraction method, it was the β-form modification with the X-ray diffraction pattern shown in FIG. 2, having characteristic peaks at diffraction angles (2θ) of about 8.9° and about 24.7°.

Next, the β-form crystals obtained were dispersed in 10 times the volume of water and stirred at 80±2° C. for 2 hours, to bring about crystal transformation.

Following the crystal transformation, reduced-pressure filtration was carried out with a Buchner funnel and filtration flask, and then drying performed under vacuum. When the crystals obtained were analysed by the X-ray diffraction method, they were the α-form crystals with the X-ray diffraction pattern shown in FIG. 1.

EXAMPLE 2

(Dyeing Example)

0.2 g of the α-form crystal modification of the monoazo compound obtained in Example 1 above was dispersed in 1 liter of water containing 0.2 g of naphthalene-sulphonic acid/formaldehyde condensate and 0.2 g of higher alcohol sulphate ester.

100 g of polyester fibre was immersed in this dye bath, and the dye bath temperature raised from 70° C. to 135° C. at a rate of about 2° C./min. After dyeing for 30 minutes at this temperature, when soaping, washing with water and drying were carried out, the dispersion properties of the dye were excellent and there was level dyeing of the dyed material. The light fastness of the dyed material obtained with blue-violet light was good at 5–6 and so too the fastness to rubbing at 4–5.

Now, when the same dyeing experiment was carried out with the β-form crystal modification obtained part-way through the aforesaid production example, there was partial aggregation of the dye in the dye bath and non-uniformly dyed material was obtained. Moreover, the rubbing fastness was extremely poor, at 1.

EXAMPLE 3

(Dyeing Example)

When dyeing was carried out in the same way as in Example 2, except that there was employed three times the amounts of the naphthalenesulphonic acid/formaldehyde condensate and higher alcohol sulphate ester, namely 0.6 g in each case, plus three times the amount of water, namely 3 liters, under dyeing conditions of 60 minutes at 130° C., so that the dyeing method was somewhat less severe, it was possible to carry out excellent dyeing in the same way as in Example 2 with the α-form crystal modification of the present invention, and the dyed material obtained had an excellent light fastness of 5–6 and an excellent rubbing fastness of 4–5. In contrast, when the β-type crystal form was used, while there was a slight improvement compared to Example 2, a non-level dyed material was still obtained and the rubbing fastness was 3.

What is claimed is:

1. A water-insoluble monoazo dye represented by the following structural formula [I]

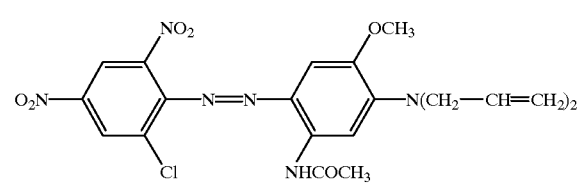

(I)

having a crystal modification characterized by an X-ray diffraction pattern (CuK$_\alpha$) showing one strong peak at a diffraction angle (2θ) of 11.1±0.1° and also four intermediate peaks at 8.1±0.1°, 21.8±0.1°, 23.1±0.1° and 25.2±0.1°.

2. A process for the dyeing of polyester fibre under conditions comprising a dye bath ratio of no more than 15 times the weight and a dispersion agent usage ratio of no more than 3 times the weight in terms of the dye which comprises applying thereto the monoazo dye according to claim 1.

3. A process to produce a water insoluble monoazo dye of the formula I

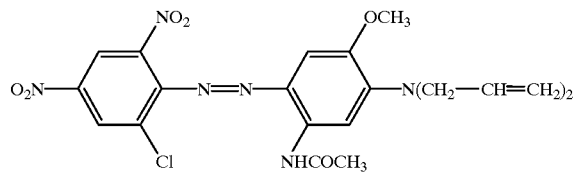

(I)

having a crystal modification characterized by an X-ray diffraction pattern (CuK$_\alpha$) showing one strong peak at a diffraction angle (2θ) of 11.1±0.1° and also four intermediate peaks at 8.1±0.1°, 21.8±0.1°, 23.1±0.1° and 25.2±0.1°, which comprises synthesizing by diazotizing 6-chloro-2,4-dinitroaniline, and then carrying out a coupling reaction with 3-(N,N-diallyl)amino-4-methoxyacetanilide coupler in an aqueous medium at a temperature of 0 to 15° C. from 0.5 to 15 hours thereby forming the β-form and subjecting said β-form to further treatment which comprises 1) dispersing the β-form in an aqueous medium optionally in the presence of a dispersing agent then stirring at a temperature of 60 to 130° C. for 0.5 to 30 hours or 2) dispersing the β-form in an organic solvent and then stirring at a temperature of 15 to 100° C. for 0.5 to 10 hours.

4. The process as claimed in claim 3, wherein the temperature of the coupling reaction is from 0 to 10° C.

\* \* \* \* \*